US012613018B2

(12) United States Patent
Wallhorn

(10) Patent No.: US 12,613,018 B2
(45) Date of Patent: Apr. 28, 2026

(54) LIGHTING DEVICE, IN PARTICULAR LIGHTING DEVICE FOR A VEHICLE

(71) Applicant: Hella GmbH & Co. KGaA, Lippstadt (DE)

(72) Inventor: Dirk Wallhorn, Guetersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/310,486

(22) PCT Filed: Feb. 21, 2019

(86) PCT No.: PCT/EP2019/054284
§ 371 (c)(1),
(2) Date: Aug. 5, 2021

(87) PCT Pub. No.: WO2020/169197
PCT Pub. Date: Aug. 27, 2020

(65) Prior Publication Data
US 2022/0186899 A1 Jun. 16, 2022

(51) Int. Cl.
*F21S 41/19* (2018.01)
*F21S 41/141* (2018.01)
*F21S 41/20* (2018.01)

(52) U.S. Cl.
CPC ............. *F21S 41/19* (2018.01); *F21S 41/141* (2018.01); *F21S 41/285* (2018.01)

(58) Field of Classification Search
CPC ........ F21S 41/19; F21S 41/141; F21S 41/285; F21S 43/235; F21S 43/237; F21S 43/245; F21V 21/32
See application file for complete search history.

(56) References Cited

U.S. PATENT DOCUMENTS 5,073,462 A * 12/1991 Gervay .................. G03F 7/027 428/209
7,144,139 B2 * 12/2006 Kramer .................. E04F 19/06 362/240

(Continued)

FOREIGN PATENT DOCUMENTS

CN 103574355 A 2/2014
DE 19621148 A1 12/1997

(Continued)

OTHER PUBLICATIONS

Apstpe, Shore a Hardness Scale Cross References, 2014 (Year: 2014).*

(Continued)

*Primary Examiner* — Matthew J. Peerce
(74) *Attorney, Agent, or Firm* — Husch Blackwell LLP

(57) ABSTRACT

A Lighting device, in particular lighting device for a vehicle, is provided comprising at least one light source from which light is emitted during operation of the lighting device. A first flexible foil is also provided through which the light emanating from the at least one light source passes at least partially. The first foil influences the light passing through in such a way that directed light emerges from the first foil. The lighting device also comprising a second flexible foil into which the at least one light source is integrated or on which the at least one light source is arranged.

13 Claims, 1 Drawing Sheet

(56) References Cited

U.S. PATENT DOCUMENTS

| | | | | |
|---|---|---|---|---|
| 8,360,608 | B2 * | 1/2013 | Wildner | F21S 4/20<br>362/249.11 |
| 9,115,858 | B2 * | 8/2015 | Levante | F21V 23/06 |
| 9,393,900 | B2 * | 7/2016 | Held | B60Q 1/2696 |
| 9,644,813 | B2 * | 5/2017 | Yang | F21V 5/008 |
| 9,909,719 | B2 * | 3/2018 | Camarota | F21V 5/04 |
| 10,132,478 | B2 * | 11/2018 | Vasylyev | F21V 9/30 |
| 10,461,063 | B2 * | 10/2019 | Maki | H01L 23/5387 |
| 10,520,143 | B1 * | 12/2019 | Findlay | F21V 31/04 |
| 10,632,901 | B2 * | 4/2020 | Danner | B60Q 1/18 |
| 11,092,305 | B2 * | 8/2021 | Nishio | G02B 5/1861 |
| 11,204,139 | B2 * | 12/2021 | Ansems | F21K 9/90 |
| 2003/0072153 | A1 * | 4/2003 | Matsui | H05K 1/0281<br>362/800 |
| 2003/0099111 | A1 * | 5/2003 | Shih | B60Q 1/2665<br>362/544 |
| 2003/0147253 | A1 * | 8/2003 | Shy | B60Q 1/28<br>362/540 |
| 2004/0223328 | A1 | 11/2004 | Lee et al. | |
| 2004/0246737 | A1 * | 12/2004 | Voelker | B60Q 1/444<br>362/543 |
| 2009/0080208 | A1 * | 3/2009 | Droste | G02B 6/001<br>362/509 |

FOREIGN PATENT DOCUMENTS

| | | | |
|---|---|---|---|
| DE | 102013109436 | A1 | 3/2014 |
| DE | 102014217714 | A1 | 3/2016 |
| DE | 202016101310 | U1 | 7/2017 |
| EP | 2696135 | A2 | 2/2014 |
| WO | 0198708 | A1 | 12/2001 |

OTHER PUBLICATIONS

Chinese Office Action dated Nov. 1, 2022 issued in corresponding Chinese application.

Chinese Office Action dated May 26, 2023, issued in corresponding Chinese application.

* cited by examiner

LIGHTING DEVICE, IN PARTICULAR LIGHTING DEVICE FOR A VEHICLE

CROSS REFERENCE

This application claims priority to PCT Application No. PCT/EP2019/054284, filed Feb. 21, 2019, the entirety of which is hereby incorporated by reference.

FIELD OF THE INVENTION

This invention concerns a lighting device, in particular a lighting device for a vehicle.

BACKGROUND OF THE INVENTION

A lighting device of the above type is known from DE 10 2014 117 883 A1. The lighting device described therein may, for example, be designed as a headlamp of a vehicle and comprises, for example, a light source designed as a light-emitting diode (LED) or as a laser diode. The lighting device also includes a hologram through which the light from the light source passes. The hologram is especially designed as a photopolymer in the form of a flexible foil. The hologram may produce directional light so that a light distribution corresponding to a passing beam and/or a driving beam can be produced in front of the vehicle.

The problem underlying this invention is the creation of a lighting device of the type mentioned above, which can be better adapted to different requirements, in particular as regards the positioning or installation space of the lighting device.

BRIEF SUMMARY OF THE INVENTION

The lighting device shall comprise a second flexible foil in which the at least one light source is integrated or on which the at least one light source is arranged. This allows the entire lighting device to be made flexible. Such a design makes it easy to adapt the lighting device to the local requirements of the vehicle, for example. In particular, it is possible, for example, to apply the lighting device to curved surfaces. In addition, a lighting device with two foils for generating and shaping the light can be made very flat, so that the space requirements of the lighting device are low.

It may be provided that the lighting device comprises several light sources integrated into the second foil or arranged on the second foil. The number of light sources can be adapted to the function of the lighting device. For example, the at least one light source can be designed as a light-emitting diode.

It is possible that contact elements for making electrical contact with the at least one light source are arranged on the second foil, in particular laterally on the second foil. This means that even a very flat lighting device can be reliably connected.

It may be provided that the first foil and the second foil are arranged parallel to one another, in particular the two foils being spaced apart from one another. Preferably, the lighting device comprises a spacer arranged between the first and second foils, the spacer in particular also being flexible. The spacer can, for example, be designed as a frame or as a transparent plastic component. The spacer can have a suitable thickness to optimize the distance between the two foils. Furthermore, the flexibility of the spacer ensures that the entire lighting device can be designed to be flexible.

It is possible for the lighting device to comprise means for dissipating the heat generated by the at least one light source, the means being arranged in particular on the side of the second foil facing away from the first foil. The means for dissipating the heat generated by the at least one light source may, for example, be in the form of a heat-conducting paste. Despite the fact that the lighting device may be very flat, the heat generated by the light sources can be dissipated well in this way.

It may be provided that the lighting device comprises adhesive means enabling the lighting device to be fastened to a surface, the adhesive means being arranged in particular on the side of the second foil facing away from the first foil. The adhesives can be used to glue the lighting device to a curved surface such as the engine hood of a vehicle.

It is possible that the lighting device is waterproof. This allows the lighting device to be installed in an exterior space, such as the outside of a motor vehicle, without allowing water to enter the possibly sensitive electronics of the lighting device.

It may be provided that the first foil influences the light passing therethrough in such a way that a light distribution is generated which corresponds to the application purpose of the lighting device. For example, when the lighting device is designed as a headlamp of a motor vehicle, the first foil may be able to produce a suitable light distribution.

In particular, the first foil may comprise a hologram or be formed as a hologram, the hologram being in particular a replica hologram of a computer-generated master hologram. A suitable hologram design can, for example, generate a light distribution that corresponds to that of a passing beam and/or a driving beam.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical and functionally identical parts are provided with the same reference signs.

The figures depict a lighting device corresponding to the invention, which can be used, for example, as a headlamp of a motor vehicle. The lighting device comprises a first flexible foil 1, a second flexible foil 2 and a spacer 3, which is also flexible, arranged between the first foil 1 and the second foil 2.

Figure 1:
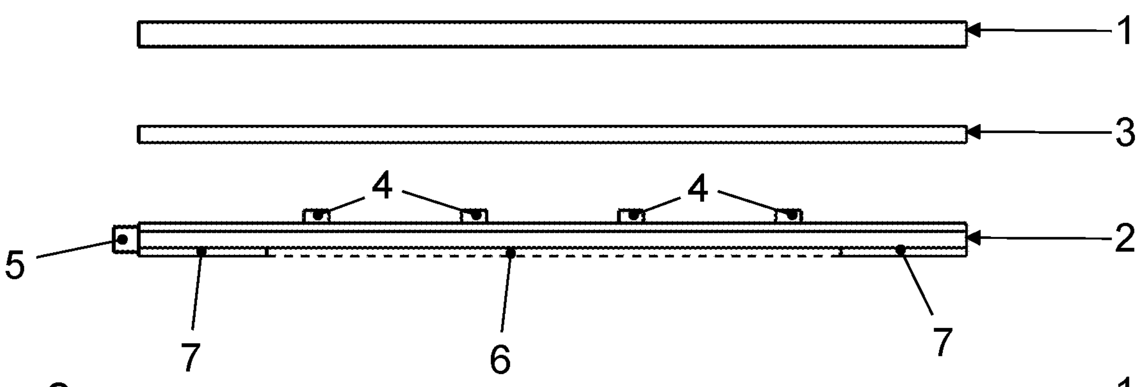
FIG. 1 is an exploded view of a lighting device according to the invention in a side view.
Figure 2:
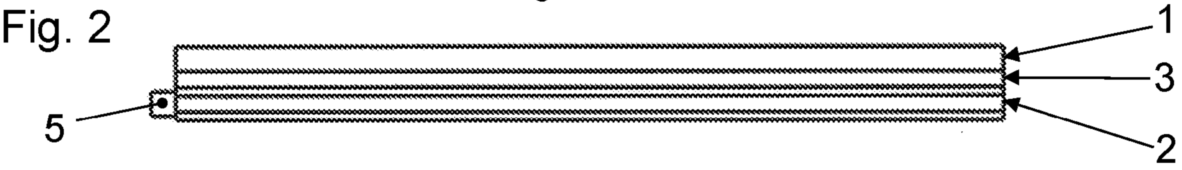
FIG. 2 is a side view of the lighting device according to FIG. 1 when assembled.
Figure 3:
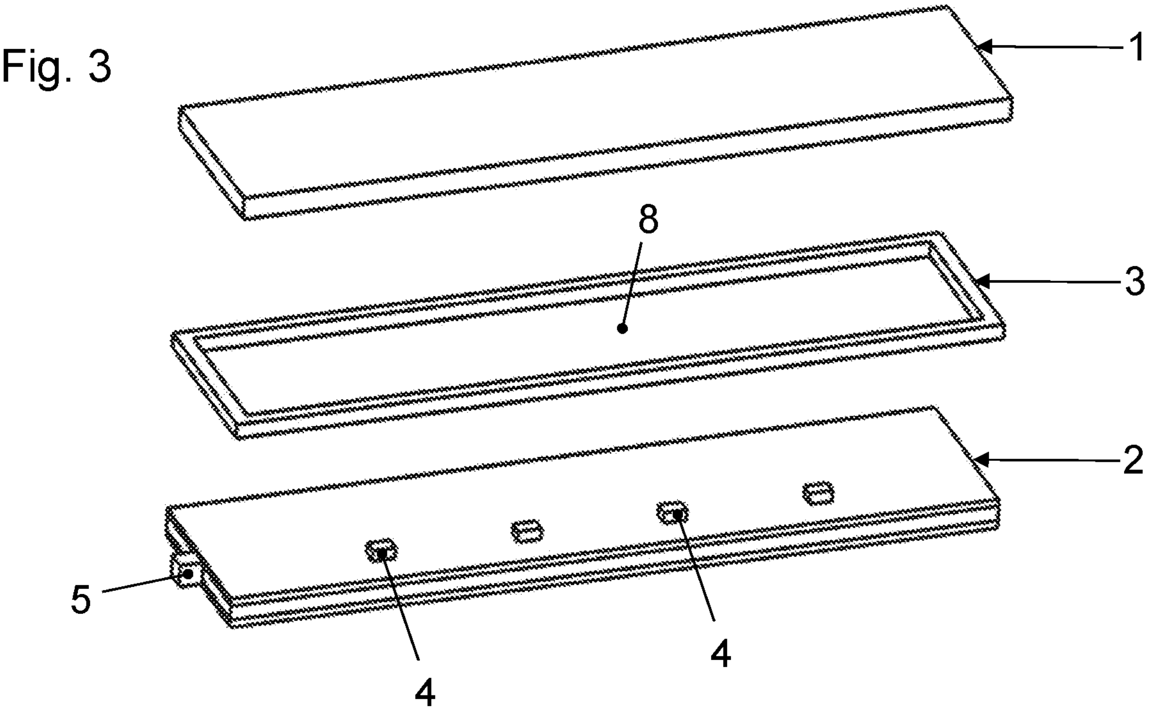
FIG. 3 is a perspective explosion view of the lighting device according to FIG. 1.

A plurality of light sources 4 formed as light emitting diodes are arranged on the upper side of the second foil 2 as shown in FIG. 1 and FIG. 3. During operation of the lighting device, the light emitted by the light-emitting diodes propagates upwards in FIG. 1 to FIG. 4 or in the direction of the first foil 1.

Contact elements 5 for the electrical contacting of the light sources 4 are arranged on at least one end face of the second foil 2. The contact elements 5 are connected to the individual light sources 4 by means of connecting elements such as conductor paths which are not illustrated.

Only schematically indicated means 6 for dissipating the heat generated by the light sources 4 are arranged on the lower side of the second foil 2 shown in FIGS. 1 to 4 or on the side of the second foil 2 facing away from the light sources 4. The means 6 for dissipating the heat generated by the light sources 4 are designed as heat conducting paste.

On the lower side of the second foil 2 shown in FIGS. 1 to 4, or on the side of the second foil 2 facing away from the light sources 4, there are also adhesives 7, which enable the lighting device to be attached to a surface. The adhesives 7, for example, can be designed as a double-sided adhesive tape applied from below to the surface of the second foil 2, which surrounds the heat-conducting paste.

The first foil 1 comprises a hologram or is designed as a hologram, whereby the hologram is in particular a replica hologram of a computer-generated master hologram. The hologram can influence the light emitted by light sources 4 in such a way as to generate a light distribution appropriate to the application purpose of the lighting device. In particular, a typical light distribution of a headlamp can be generated.

The first foil 1 and the second foil 2 are parallel and spaced from each other. It is possible that the foils are not arranged parallel to each other. The spacer 3, which is arranged between the two foils 1, 2, can in particular consist of silicone. The spacer 3 has a suitable thickness to optimize the distance between the two foils 1, 2. At a suitable distance, the first foil 1 can be optimally illuminated by the light of the light sources 4 so that the desired light distribution is achieved.

The spacer 3 provided in the example shown is designed as a circumferential frame with a large central opening 8 for the light to pass through. However, it is also possible to use a plate-shaped, transparent plastic part instead of a frame, through which the light from light sources 4 can pass.

Figure 4:
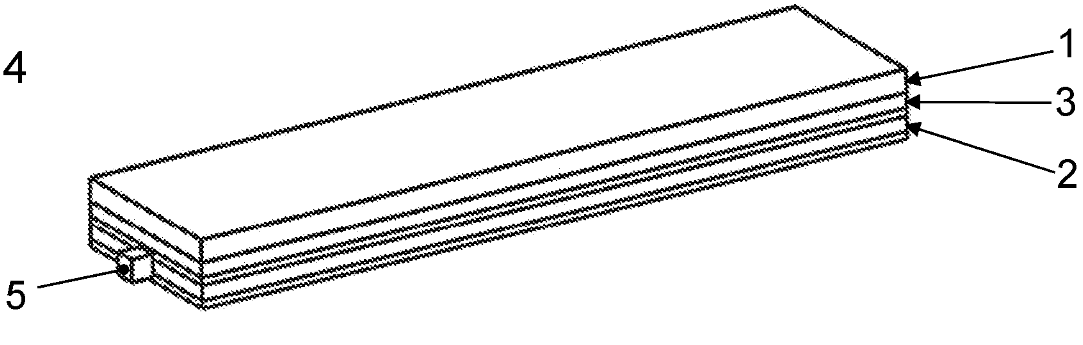
FIG. 4 is a perspective view of the lighting device according to FIG. 1 when assembled.

FIG. 2 and FIG. 4 show the lighting device when assembled. Because both foils 1, 2 and spacer 3 are flexible, the lighting device as a whole is also flexible. It can therefore be adapted to objects with a curved surface. For example, the lighting device can be attached to a curved engine hood of a motor vehicle.

The spacer 3 and the two foils 1, 2 can be connected to each other in such a way that the lighting device is watertight.

LIST OF REFERENCE SIGNS

1 first foil
2 second foil
3 spacer
4 light source
5 contact element
6 means for dissipating heat
7 adhesive means
8 opening in a spacer in the form of a frame

The invention claimed is:

1. A lighting device for a headlamp in a motor vehicle, the lighting device comprising:

at least one light source from which light is emitted outwardly from the motor vehicle during operation of the lighting device;

a first flexible foil through which the light emanating from the at least one light source passes at least partially, the first flexible foil influencing the light passing through in such a way that directed light emerges from the first flexible foil, the first flexible foil having a first side facing the at least one light source and a second side opposite the first side, the directed light emerging from the second side of the first flexible foil;

a second flexible foil into which the at least one light source is integrated, the second flexible foil having a first side and a second side opposite the first side, the second side of the second flexible foil facing the first side of the first flexible foil;

a flexible spacer positioned and located between the first flexible foil and the second flexible foil to provide a distance between the first flexible foil and the second flexible foil, wherein the flexible spacer comprises a frame that is separate from the first flexible foil and the second flexible foil, wherein the frame abuts the first side of the first flexible foil, and wherein the frame abuts the second side of the second flexible foil;

an aperture being defined by the frame of the flexible spacer and extending through the flexible spacer;

an adhesive arranged on the first side of the second foil to fasten the lighting device to a surface; and a heat conducting paste arranged on the first side of the second foil for dissipating heat generated by the at least one light source, wherein the adhesive surrounds the heat conducting paste;

wherein the at least one light source extends into the aperture such that the aperture forms a gap at least partially surrounding the at least one light source; and wherein the at least one light source is located entirely below the first flexible foil.

2. The lighting device according to claim 1, wherein the at least one light source comprises two or more light sources each extending into the aperture, and wherein the aperture is a single aperture forming a gap at least partially surrounding the two or more light sources.

3. The lighting device according to claim 1, wherein the at least one light source is designed as a light-emitting diode.

4. The lighting device according to claim 1, wherein contact elements for making electrical contact with the at least one light source are arranged on the second foil.

5. The lighting device according to claim 1, wherein the first foil and the second foil are arranged parallel to one another.

6. The lighting device according to claim 1, wherein the frame of the flexible spacer is connected to the first side of the first foil and to the second side of the second foil via watertight connections such that the lighting device is waterproof.

7. The lighting device according to claim 1, wherein the first foil influences the light passing therethrough in such a way that a light distribution is generated which corresponds to the application purpose of the lighting device.

8. A lighting device for a headlamp in a motor vehicle, the lighting device comprising:

a plurality of light sources from which light is emitted outwardly from the motor vehicle during operation of the lighting device;

a first flexible foil through which the light emanating from the plurality of light sources passes at least partially, the first flexible foil influencing the light passing through in such a way that directed light emerges from the first flexible foil, the first flexible foil having a first side facing the plurality of light sources and a second side opposite the first side, the directed light emerging from the second side of the first flexible foil;

a second flexible foil into which the plurality of light sources are integrated, the second flexible foil having a first side and a second side opposite the first side, the second side of the second flexible foil facing the first side of the first flexible foil;

a flexible spacer positioned and located between the first flexible foil and the second flexible foil to provide a distance between the first flexible foil and the second flexible foil, wherein the flexible spacer comprises a frame that is separate from the first flexible foil and the second flexible foil, wherein the frame abuts the first side of the first flexible foil, and wherein the frame abuts the second side of the second flexible foil;

a single aperture being defined by the frame of the flexible spacer and extending through the flexible spacer;

an adhesive arranged on the first side of the second foil to fasten the lighting device to a surface; and a heat conducting paste arranged on the first side of the second foil for dissipating heat generated by the at least one light source, wherein the adhesive surrounds the heat conducting paste;

wherein the plurality of light sources each extend into the single aperture; and wherein the plurality of light sources are located entirely below the first flexible foil.

9. The lighting device according to claim 8, wherein a gap is provided between the flexible spacer and each of the plurality of light sources.

10. The lighting device according to claim 1, wherein the flexible spacer is made of silicone.

11. The lighting device according to claim 8, wherein the flexible spacer is made of silicone.

12. The lighting device according to claim 4, wherein the contact elements extend laterally from the second foil beyond the flexible spacer.

13. The lighting device according to claim 8, wherein contact elements for making electrical contact with the at least one light source are arranged on the second foil, and wherein the contact elements extend laterally from the second foil beyond the flexible spacer.

* * * * *